(12) United States Patent
Yu et al.

(10) Patent No.: US 7,782,749 B2
(45) Date of Patent: Aug. 24, 2010

(54) METHOD FOR MAPPING PHYSICAL DOWNLINK CONTROL CHANNEL TO RESOURCES AND APPARATUS FOR TRANSMITTING/RECEIVING THE MAPPED PHYSICAL DOWNLINK CONTROL CHANNEL IN A WIRELESS COMMUNICATION SYSTEM

(75) Inventors: Jae-Chon Yu, Suwon-si (KR);
Hwan-Joon Kwon, Suwon-si (KR);
Dong-Hee Kim, Yongin-si (KR);
Yeon-Ju Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 130 days.

(21) Appl. No.: 12/053,155

(22) Filed: Mar. 21, 2008

(65) Prior Publication Data

US 2008/0232495 A1 Sep. 25, 2008

(30) Foreign Application Priority Data

Mar. 21, 2007 (KR) ...................... 10-2007-0027753
Apr. 12, 2007 (KR) ...................... 10-2007-0036198

(51) Int. Cl.
*H04J 9/00* (2006.01)
(52) U.S. Cl. .................. 370/204; 370/329; 370/335
(58) Field of Classification Search ................. 370/203, 370/204, 205, 206, 208, 209, 210, 328, 329, 370/342, 441, 335, 341; 455/450
See application file for complete search history.

(56) References Cited

U.S. PATENT DOCUMENTS

| 7,480,279 | B2 * | 1/2009 | Kim | 370/335 |
|---|---|---|---|---|
| 7,512,076 | B2 * | 3/2009 | Kwon et al. | 370/252 |
| 2002/0141433 | A1 * | 10/2002 | Kwon et al. | 370/441 |
| 2003/0063595 | A1 * | 4/2003 | You et al. | 370/342 |
| 2003/0103480 | A1 * | 6/2003 | You et al. | 370/335 |
| 2003/0147422 | A1 | 8/2003 | You et al. | |
| 2004/0202131 | A1 | 10/2004 | An et al. | |
| 2005/0128999 | A1 | 6/2005 | Kwon et al. | |
| 2005/0138531 | A1 * | 6/2005 | Kim | 714/774 |
| 2007/0002936 | A1 | 1/2007 | Kwon et al. | |
| 2007/0104150 | A1 * | 5/2007 | Fernandez-Corbaton et al. | 370/335 |
| 2007/0263586 | A1 * | 11/2007 | You et al. | 370/342 |
| 2008/0019263 | A1 * | 1/2008 | Stolpman | 370/210 |
| 2008/0089281 | A1 * | 4/2008 | Yoon et al. | 370/329 |
| 2008/0159323 | A1 * | 7/2008 | Rinne et al. | 370/431 |
| 2008/0192718 | A1 * | 8/2008 | Jongren et al. | 370/342 |
| 2008/0282131 | A1 * | 11/2008 | You et al. | 714/758 |
| 2009/0122736 | A1 * | 5/2009 | Damnjanovic et al. | 370/311 |
| 2009/0161618 | A1 * | 6/2009 | Johansson et al. | 370/329 |
| 2009/0168922 | A1 * | 7/2009 | Malladi et al. | 375/316 |

* cited by examiner

*Primary Examiner*—Chi H Pham
*Assistant Examiner*—Kevin Mew
(74) *Attorney, Agent, or Firm*—The Farrell Law Firm, LLP

(57) ABSTRACT

A method for mapping a Physical Downlink Control Channel (PDCCH) to resources and an apparatus for transmitting/receiving the mapped PDCCH in a wireless communication system are provided, in which if at least one PDCCH is scheduled to be transmitted in a subframe according to a predetermined scheduling scheme, the PDCCHs are concatenated, interleaved, and mapped to at least one Resource Element (RE).

14 Claims, 7 Drawing Sheets

METHOD FOR MAPPING PHYSICAL DOWNLINK CONTROL CHANNEL TO RESOURCES AND APPARATUS FOR TRANSMITTING/RECEIVING THE MAPPED PHYSICAL DOWNLINK CONTROL CHANNEL IN A WIRELESS COMMUNICATION SYSTEM

PRIORITY

This application claim priority under 35 U.S.C. §119(a) to a Korean Patent Application filed in the Korean Intellectual Property Office on Mar. 21, 2007 and assigned Serial No. 2007-27753 and a Korean Patent Application filed in the Korean Intellectual Property Office on Apr. 12, 2007 and assigned Serial No. 2007-36198, the contents of which are incorporated herein by reference.

BACKGROUND OF THE INVENTION

1. Field of the Invention

The present invention generally relates to a method and apparatus for efficiently using a control channel to achieve a maximum interference diversity in a wireless communication system. More particularly, the present invention relates to a method and apparatus for efficiently mapping a Physical Downlink Control CHannel (PDCCH) to time-frequency resources in an Orthogonal Frequency Division Multiple Access (OFDMA) wireless communication system.

2. Description of the Related Art

Recently, Orthogonal Frequency Division Multiplexing (OFDM) has been actively studied as a promising means for high-speed data transmission on wired/wireless channels in mobile communication systems. OFDM is a special case of Multi-Carrier Modulation (MCM) in which an input serial symbol sequence is converted to parallel symbol sequences and modulated to orthogonal subcarriers, i.e., subcarrier channels. OFDMA is a multi-user version of OFDM, in which multiple users are distinguished by subcarriers, i.e., different subcarriers are allocated to different users.

FIG. 7 illustrates a method for transmitting data to a plurality of users in a conventional OFDMA system.

Referring to FIG. 7, the horizontal axis represents time and the vertical axis represents frequency. Reference numeral 701 denotes a time-domain resource allocation unit, usually including a plurality of OFDM symbols. This resource allocation time unit is referred to as a subframe. Reference numerals 702, 703 and 704 denote first, $(N-1)^{th}$, and $N^{th}$ bands when a total system band is divided into N bands. Each band generally includes a plurality of subcarriers. As illustrated in FIG. 7, typically, a plurality of resource blocks are formed with time and frequency resources, and resources are allocated to a plurality of users in resource blocks in an OFDM system. A single resource block is equivalent to the resources defined by one subframe and one band in FIG. 7. For example, if one band includes 12 subcarriers and one subframe is comprised of 14 OFDM symbols, one resource block has 168 (12×14) time and frequency resources. A minimum time and frequency resource unit, i.e., one subcarrier in one OFDM symbol is referred to as a Resource Element (RE).

As described above, a Node B allocates resources to at least one User Equipment (UE) in units of resource blocks in every subframe and notifies the UEs of the resource allocation results by resource allocation information in every subframe in the OFDM system. A channel carrying the resource allocation information is a shared control channel or a PDCCH. Hereinafter, a PDCCH is referred to as a control channel. In general, the control channel may include other information in addition to the resource allocation information, which will not be described in detail herein. Information including the resource allocation information that the control channel delivers is called control information. A single control channel carries resource allocation information about a single UE. Hence, when resources are allocated simultaneously to a plurality of UEs in a subframe, a plurality of control channels is transmitted to the UEs.

Generally, control channels that the Node B generates for a plurality of users are mapped to REs in Time Division Multiplexing/Frequency Division Multiplexing (TDM/FDM) after channel coding and interleaving, prior to transmission to the users. The control channels are mapped in the same manner for each Node B and for each subframe. Resource mapping refers to mapping the control channels to physical REs. For example, if five control channels are transmitted in a subframe, the five control channels are mapped to REs in the same manner in every Node B. Therefore, when interference occurs between control channels from different Node Bs, the absence of randomization effects may cause performance degradation. In other words, any control channel is susceptible to some statistically strong interference, resulting in performance degradation.

SUMMARY OF THE INVENTION

An aspect of exemplary embodiments of the present invention is to address at least the problems and/or disadvantages described above and to provide at least the advantages described below. Accordingly, an aspect of the present invention is to provide a method for mapping a Physical Downlink Control Channel PDCCH to resources in order to reduce interference that a PDCCH from a Node B receives from PDCCHs from other Node Bs in a wireless communication system.

Another aspect of the present invention provides an apparatus for transmitting a PDCCH that has been mapped in a predetermined method to reduce interference that a PDCCH from a Node B receives from PDCCHs from other Node Bs in a wireless communication system.

A further aspect of the present invention provides an apparatus for receiving a PDCCH that has been mapped in a predetermined method to reduce interference that a PDCCH from a Node B receives from PDCCHs from other Node Bs in a wireless communication system.

In accordance with an aspect of the present invention, there is provided a method for mapping a plurality of PDCCHs to resources in a wireless communication system, in which if at least one PDCCH is scheduled to be transmitted in a subframe according to a predetermined scheduling scheme, the PDCCHs are concatenated, interleaved, and mapped to at least one RE.

In accordance with another aspect of the present invention, there is provided a method for mapping a plurality of PDCCHs to resources in a wireless communication system, in which if at least one PDCCHs is scheduled to be transmitted in a subframe according to a predetermined scheduling scheme, at least one CE is allocated to each of the PDCCHs, concatenated, interleaved, and mapped to at least one RE.

In accordance with a further aspect of the present invention, there is provided a method for mapping a plurality of PDCCHs to resources in a wireless communication system, in which if at least one PDCCH is scheduled to be transmitted in a subframe according to a predetermined scheduling scheme, at least one or Control Element (CE) are allocated to each of the PDCCHs and concatenated, each of the concatenated CEs is modulated to at least one modulation symbol, and the modulation symbols are interleaved and mapped to REs.

In accordance with still another aspect of the present invention, there is provided an apparatus for mapping a plurality of PDCCHs to resources and transmitting the mapped PDCCHs in a wireless communication system, in which if at least one PDCCH is scheduled to be transmitted in a subframe according to a predetermined scheduling scheme, a concatenator allocates at least one CE to each of the PDCCHs and concatenates the allocated CEs, an interleaver interleaves the concatenated CEs, and a CE-to-RE mapper maps the interleaved CEs to REs.

In accordance with still further aspect of the present invention, there is provided an apparatus for mapping a plurality of PDCCHs to resources and transmitting the mapped PDCCHs in a wireless communication system, in which if at least one PDCCH is scheduled to be transmitted in a subframe according to a predetermined scheduling scheme, a concatenator allocates at least one CE to each of the PDCCHs, and concatenates the allocated CEs, a modulator modulates each of the concatenated CEs to at least one modulation symbol, an interleaver interleaves the modulation symbols, and a CE-to-RE mapper maps the interleaved modulation symbols to REs.

In accordance with still further aspect of the present invention, there is provided an apparatus for receiving a PDCCH mapped to resources in a wireless communication system, in which an analog-to-digital converter converts a signal, received through an antenna, to a digital signal, a Fast Fourier Transform (FFT) processor converts the digital signal to a frequency signal, a pilot tone extractor extracts pilots from REs to which CEs are mapped among subcarriers of the frequency signal, a channel estimator performs channel estimation using the pilot tones, a RE-to-CE demapper demaps the CEs from the REs, a deinterleaver deinterleaves the demapped CEs, a demodulator demodulates the deinterleaved CEs using channel estimation information received from the channel estimator, a divider separates the demodulated CEs into pieces of PDCCH information, and a plurality of channel decoders decode the pieces of PDSCH information.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

To implement a method for mapping a control channel to resources according to the present invention, a resource allocation unit for control channel transmission, a Control channel Element (CE) is defined. The CE is different from the resource block in that the CE is a resource allocation unit for transmission of a control channel and the resource block is a resource allocation unit for data transmission. When at least one control channel is scheduled to be transmitted in a subframe according to a predetermined scheduling scheme, one or more CEs are allocated to each of the control channels. At least one of the CEs is concatenated and symbols in the CEs interleaved in an interleaving method specific to each Node B. Then the interleaved symbols are mapped to REs. The CE-to-RE mapping can also be performed in a scheme specific to each Node B.

Figure 1:
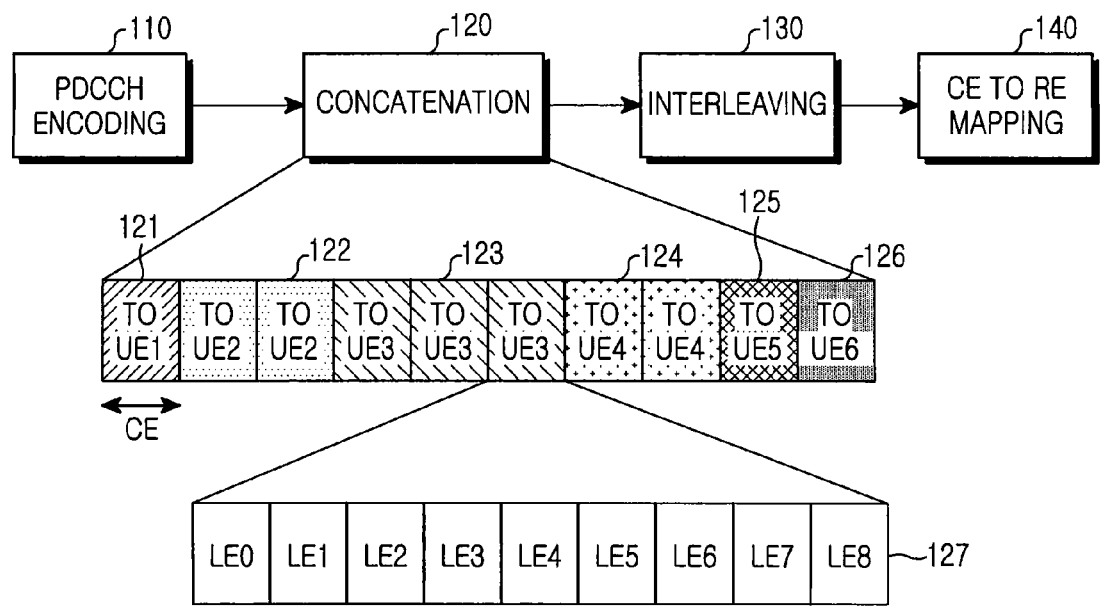
FIG. 1 illustrates an operation for mapping PDCCHs to REs according to the present invention.

FIG. 1 illustrates an operation for mapping PDCCHs to REs according to the present invention. In the illustrated case of FIG. 1, six control channels, control channel 1, control channel 2, . . . , control channel 6 are transmitted to six UEs in a subframe. Each of the six control channels includes resource allocation information about one of the six UEs. The resource allocation information about each UE is channel-encoded in a predetermined coding scheme such as convolutional coding in step 110. Then at least one of the CEs is allocated to each control channel. As stated before, a CE is defined as a resource allocation unit for control channel transmission, including a plurality of logical REs. Because mapping between a CE and physical REs can be realized in various ways, the REs are called logical REs. For instance, when one CE includes 36 logical REs, this implies that 36 modulation symbols can be transmitted in one CE. Reference numerals 121 to 126 denote allocation of at least one CE to each of the controls channels. In the illustrated case of FIG. 1, one CE, two CEs, three CEs, two CEs, one CE, and one CE are allocated to control channels 1 through 6, respectively. The reason for allocating different numbers of CEs to different control channels is that the UEs are placed in different channel statuses (different received Signal-to-Noise Ratios (SNRs)). For instance, as the UEs that receive control channels 1, 5, and 6 (121, 125 and 126) are in a good channel status, control information can be transmitted to each of the UEs in one CE (i.e. 36 modulation symbols). In contrast, the UE that receives control channel 3 (123) is in a poor channel environment and thus control information is transmitted to the UE in three CEs (i.e. 108 modulation symbols). While a total of 10 CEs are used to transmit the control channels in FIG. 1, the total number of CEs is variable in every subframe. All CEs including the control channels are concatenated in step 120. In step 130, symbols in the concatenated CEs are interleaved, i.e., the order of the concatenated CEs is permuted. Use of a different interleaving scheme for each cell facilitates randomization of CE-to-RE mapping in each BS, thereby achieving randomization of interference from neighbor BSs during transmission of each control channel.

The interleaving of step 130 will be described in great detail. Each of the concatenated CEs includes a plurality of Logical Elements (LEs) 127, of which the CE indexes are expressed as Equation (1)

$$j_{CE} = \lfloor i_{LE}/N_{CE} \rfloor \text{ where } j_{CE}=0,\ldots,N_{CE} \; i_{LE}=0,\ldots,N_{LE} \quad (1)$$

The LEs of each CE can be interleaved in an arbitrary manner not limited to a specific scheme. Hence, the LEs are interleaved by Equation (2)

$$k_{interleavedLE} = f_{interleaving}(i_{LE}) \quad (2)$$

where $f_{interleaving}(\cdot)$ represents an interleaving function.

A Pruned Bit Reversal Order (PBRO) permutation scheme can be used in order to permute the order of $N_{LE}$ LEs randomly so that adjacent LEs are farthest apart from each other. A PBRO has a different offset for each BS or for each subframe. Let the PBRO offset of each subframe of each BS be denoted by $Offset_{sector,subframe\_index}$. Then, after the interleaving, the index of each LE is given as Equation (3)

$$k_{intertreadLE} = f_{interleaving}\left(\frac{(i_{LE} + Offset_{sector,subframe\_index})}{\mod N_{LE}}\right) \quad (3)$$

$$= PBRO\left(\frac{(i_{LE} + Offset_{sector,subframe\_index})}{\mod N_{LE}}, N_{LE}\right)$$

and thus the PBRO is defined as Equation (4)

$$y = PBRO(i, N_{LE}) \quad (4)$$

The PBRO permutation value is generated in the following order.

Step 1. A PBRO parameter, n is selected according to Equation (5) such that $$N_{LE} \leq 2n \quad (5)$$

Step 2. i and j are set to an initial value 0.
Step 3. x is defined as the bit-reversed value of j using an n-bit binary format. For example, if n is 4 and j is 3, x is 12.
Step 4. If $x \leq N_{LE}$, set $PBRO(i, N_{LE})$ to x and increase i by 1.
Step 5. Otherwise, increase j by 1.
Step 6. If i<M, the procedure goes to Step 3.

When an $(i_{LE})^{th}$ LE is re-arranged to a $(k_{interleavedLE})^{th}$ LE and the index of the re-arranged LE is $o_{interleavedLE}$; $o_{interleavedLE}$ is a sequential interleaved LE index being one of $0,\ldots,N_{LE}-1$.

In the above PBRO interleaving method, for $N_{LE}=12$ and $Offset_{sector,subframe\_index}=2$, $k_{interleavedLE}$, $(i_{LE}+Offset_{sector,subframe\_index}) \mod N_{LE}$, and $o_{interleavedLE}$ are given as follows.

TABLE 1

| | | | | | | | | | | | | |
|---|---|---|---|---|---|---|---|---|---|---|---|---|
| $(i_{LE} + Offset_{sector,subframe\_index}) \mod N_{LE}$ | 2 | 3 | 4 | 5 | 6 | 7 | 8 | 9 | 10 | 11 | 0 | 1 |
| $k_{interleavedLE}$ | 4 | 2 | 10 | 6 | 1 | 9 | 5 | 3 | 11 | 7 | 0 | 8 |
| $o_{interleavedLE}$ | 0 | 1 | 2 | 3 | 4 | 5 | 6 | 7 | 8 | 9 | 10 | 11 |

As noted from Table 1, $k_{interleavedLE}$ is an index that can be obtained by distributing the $N_{LE}$ LEs as much as possible.

While each BS interleaves in a different manner by applying a BS-specific offset to PBRO interleaving, it is obvious that other methods can also be used.

Figure 2:
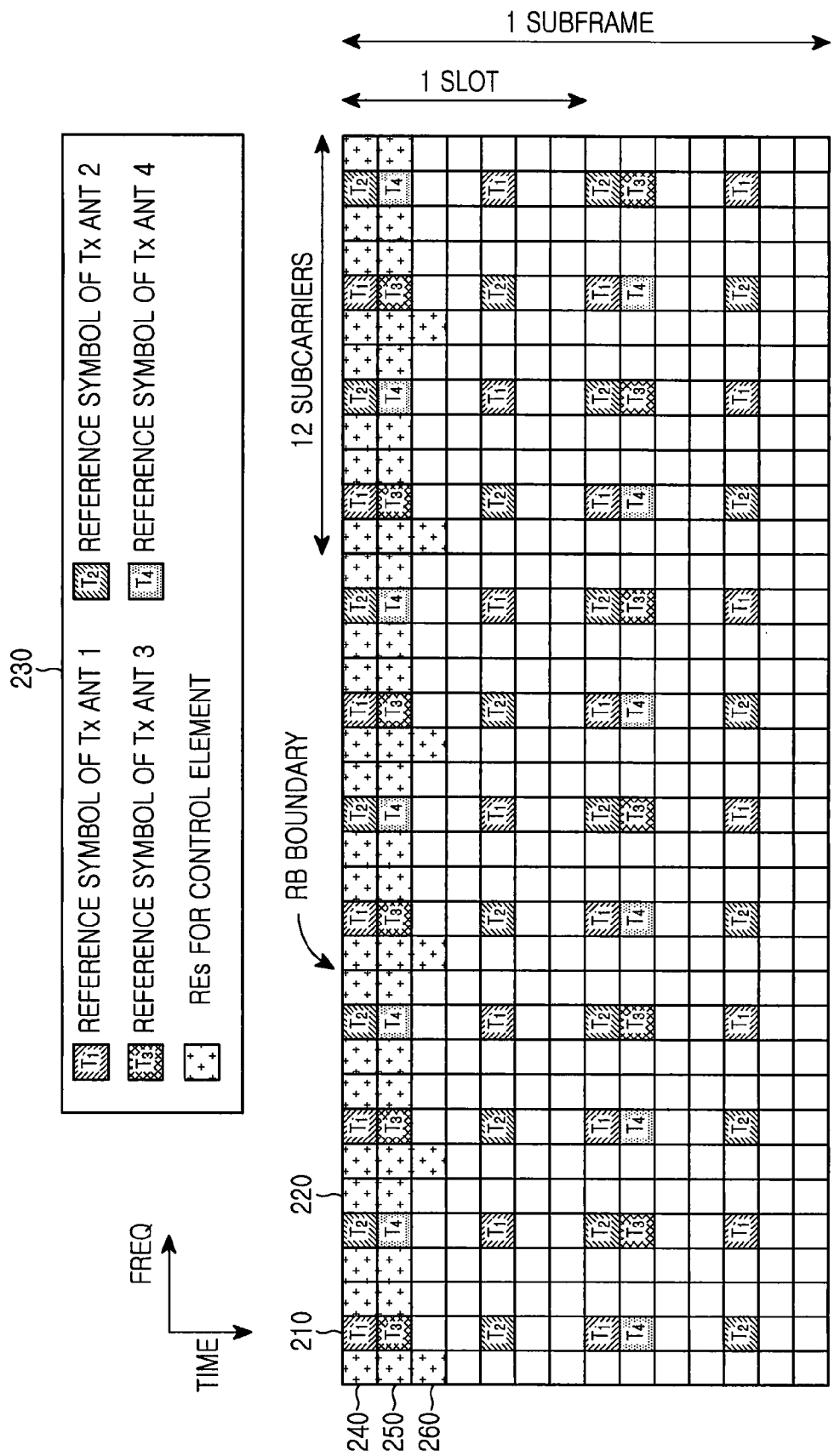
FIG. 2 illustrates an operation for mapping the Control channel Elements (CEs) of PDCCHs to REs according to the present invention.

In step 140, the interleaved modulation symbols of the control channels are mapped to REs allocated for transmission of the control channels. The mapping may be different in each BS in each subframe or in each OFDM symbol, or in each OFDM symbol of each subframe of each BS. With reference to FIG. 2, the mapping will be described in more detail.

FIG. 2 illustrates an operation for mapping the CEs of PDCCHs to REs according to the present invention. Mapping between CEs or LEs and REs will be described referring to FIG. 2. As described before, a CE is a resource allocation unit for a control channel and a single PDCCH may have at least one CE. An LE is an element of a CE. When a CE is mapped to REs, the LEs of the CE are mapped to the REs in a one-to-one correspondence. In other words, one CE is mapped to a plurality of REs. All interleaved LEs illustrated in FIG. 1 are mapped to REs in FIG. 2. An RE is an available subcarrier other than pilots or subcarriers serving other purposes in a time-frequency domain. In FIG. 2, reference numeral 210 denotes a pilot subcarrier for an antenna and reference numeral 220 denotes an RE.

While the CE-to-RE (or LE-to-RE) mapping illustrated in FIG. 2 is for a $3^{rd}$ Generation Partnership Project (3GPP) Long Term Evolution (LTE) system, the illustrated CE-to-RE mapping is a mere exemplary application and the present invention is not limited to the specific system. Hence, the present invention is applicable to other systems. In FIG. 2, one slot is defined by seven OFDM symbols and two slots form one subframe in the OFDM system. Time-frequency areas include pilot subcarriers transmitted through respective antennas and REs to which LEs will be mapped, as indicated by reference numeral 230. As noted from reference numerals 240, 250 and 260, up to three OFDM symbols include REs to which LEs can be mapped, and LEs can be mapped to the same or different REs in different OFDM symbols.

An LE-RE mapping pattern is specific to each OFDM symbol. Particularly when all REs of the last OFDM symbol are not mapped, LEs are mapped to uniformly distributed REs over a total frequency band. For example, when the total number of interleaved LEs is $N_{LE}$ and the index of an interleaved LE is $o_{interleavedLE}$, let the number of REs available for LE-to0RE mapping in a first OFDM symbol be denoted by $N_{RE,0}$. If $N_{RE,0} \leq N_{LE}$, LEs having $0,\ldots,N_{RE,0}-1$ as $o_{interleavedLE}$ are mapped to REs of the first OFDM symbol in an arbitrary manner. LE-to-RE mapping is performed in this manner in second and third OFDM symbols. The index of an LE mapped in each OFDM symbol is computed by Equation (6).

However, if $N_{RE,0} > N_{LE}$, LEs having $0,\ldots,N_{LE}-1$ as $o_{interleavedLE}$ are mapped in the first OFDM symbol in an arbitrary distributed manner.

The indexes of LEs mapped to REs in every OFDM symbol are given by $$o_{interleavedLE,0} = 0,\ldots,N_{LE}-1 \text{ if } N_{LE} < N_{RE,0} \quad (1) \; (6)$$
$$= 0,\ldots,N_{RE,0}-1 \text{ otherwise} \quad (2)$$
$$o_{interleavedLE,1} = N_{RE,0},\ldots,N_{LE}-1 \text{ if } N_{RE,0} <= N_{LE} < N_{RE,1} \quad (3)$$
$$= N_{RE,0},\ldots,N_{RE,1}-1 \text{ otherwise} \quad (4)$$
$$o_{interleavedLE,2} = N_{RE,1},\ldots,N_{LE}-1 \text{ if } N_{RE,1} <= N_{LE} < N_{RE,2} \quad (5)$$
$$= N_{RE,1},\ldots,N_{RE,2}-1 \text{ otherwise} \quad (6)$$

The LE-to-RE mapping can be carried out in an arbitrary mapping rule. In accordance with the present invention, PBRO is used.

After computing the indexes of LEs to be mapped to each OFDM symbol, LEs can be sequentially mapped to REs in the cases described in Equation (6) by Equation (7) as:

$$l_{mappedRe,j} = f_{LEtoREmapping}(o_{interleavedLE,j}) \quad (7)$$

$$= o_{interleavedLE,j}$$

Meanwhile, the LE-to-RE mapping can be performed in a PBRO scheme that has been used for the interleaving according to Equation (8), as follows.

$$l_{mappedRE,j} = f_{LEtoREmapping}\left(\left(\begin{array}{c} o_{interleavedLE,j} + \\ Offset_{sector,subframe\_index,j} \end{array}\right) \bmod N_{RE,j}\right)$$

$$= PBRO\left(\left(\begin{array}{c} o_{interleavedLE,j} + \\ Offset_{sector,subframe\_index,j} \end{array}\right) \bmod N_{RE,j}, N_{RE,j}\right)$$

If $N_{LE}=12$ and $N_{RE,0}=N_{RE,1}=N_{RE,2}=4$, $l_{mappedRE,j}$ ($o_{interleavedLE,j}$+Offset$_{sector,subframe\_index,j}$)mod $N_{RE,j}$ is given in Table 2 below, for the cases where Offset$_{sector,subframe\_index,0}$=1, Offset$_{sector,subframe\_index,1}$=2, and Offset$_{sector,subframe\_index,2}$=3.

TABLE 2

| $o_{interleavedLE,j}$ | 0 | 1 | 2 | 3 |
|---|---|---|---|---|
| $l_{mappedRE,0}$ | 2 | 1 | 3 | 0 |
| $l_{mappedRE,1}$ | 1 | 3 | 0 | 2 |
| $l_{mappedRE,2}$ | 3 | 0 |   |   |

Referring to Table 2, LEs are mapped to only RE 0 and RE 3 in the frequency domain in the last OFDM symbol. As with this case, when an OFDM symbol is not filled with LEs, LEs are distributed as much as possible using the PBRO scheme.

Figure 3:
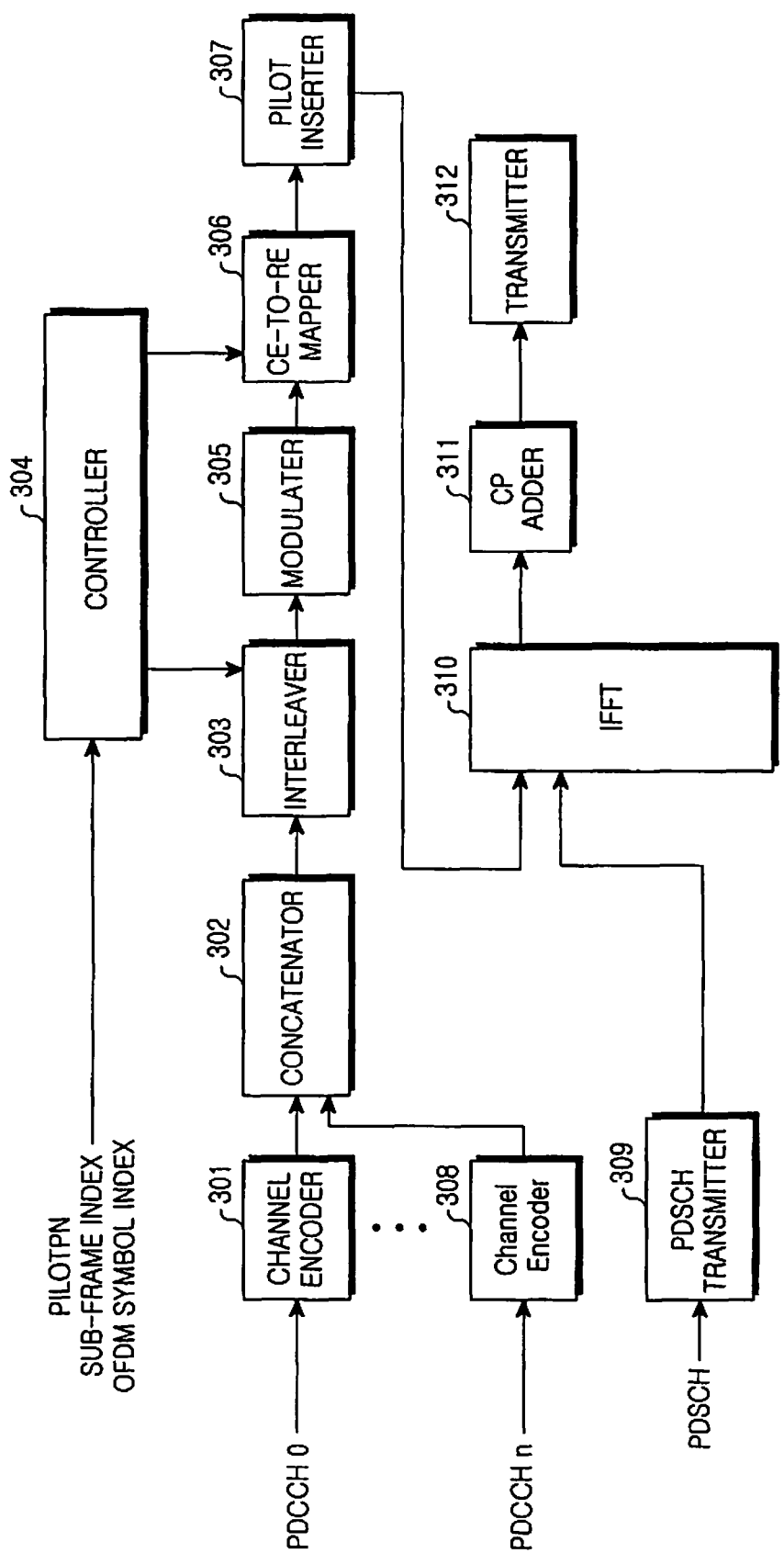
FIG. 3 is a block diagram of a PDCCH transmission apparatus according to the present invention.

FIG. 3 is a block diagram of a PDCCH transmission apparatus according to the present invention.

Referring to FIG. 3, channel encoders 301 to 308 channel-encode PDCCHs and a concatenator 302 concatenates the channel-coded PDCCHs in a predetermined method, which is not limited to a specific method in the present invention. An interleaver 303 interleaves the concatenated PDCCH signals in a different manner for each BS or for each subframe. BS information, subframe information, and OFDM symbol information required for the interleaving are PilotPN, a subframe index, and an OFDM symbol index, which are received from a controller 304. A modulator 305 modulates the interleaved signals, and a CE-to-RE mapper 306 maps CEs to REs in a different manner for each BS, for each subframe, and for each OFDM symbol under the control of the controller 304. A pilot tone inserter 307 inserts pilot tones corresponding to respective antennas in the CE-to-RE mapped signal and provides the pilot-inserted CE-to-RE mapped signal to an Inverse Fast Fourier Transform (IFFT) processor 310 along with a Physical Downlink Shared CHannel (PDSCH) from a PDSCH transmitter 309. The IFFT processor 310 multiplexes the received signals and converts the multiplexed signal to a time signal. A Cyclic Prefix (CP) adder 311 adds a CP to the time signal. A transmitter 312 transmits the CP-added signal.

Figure 4:
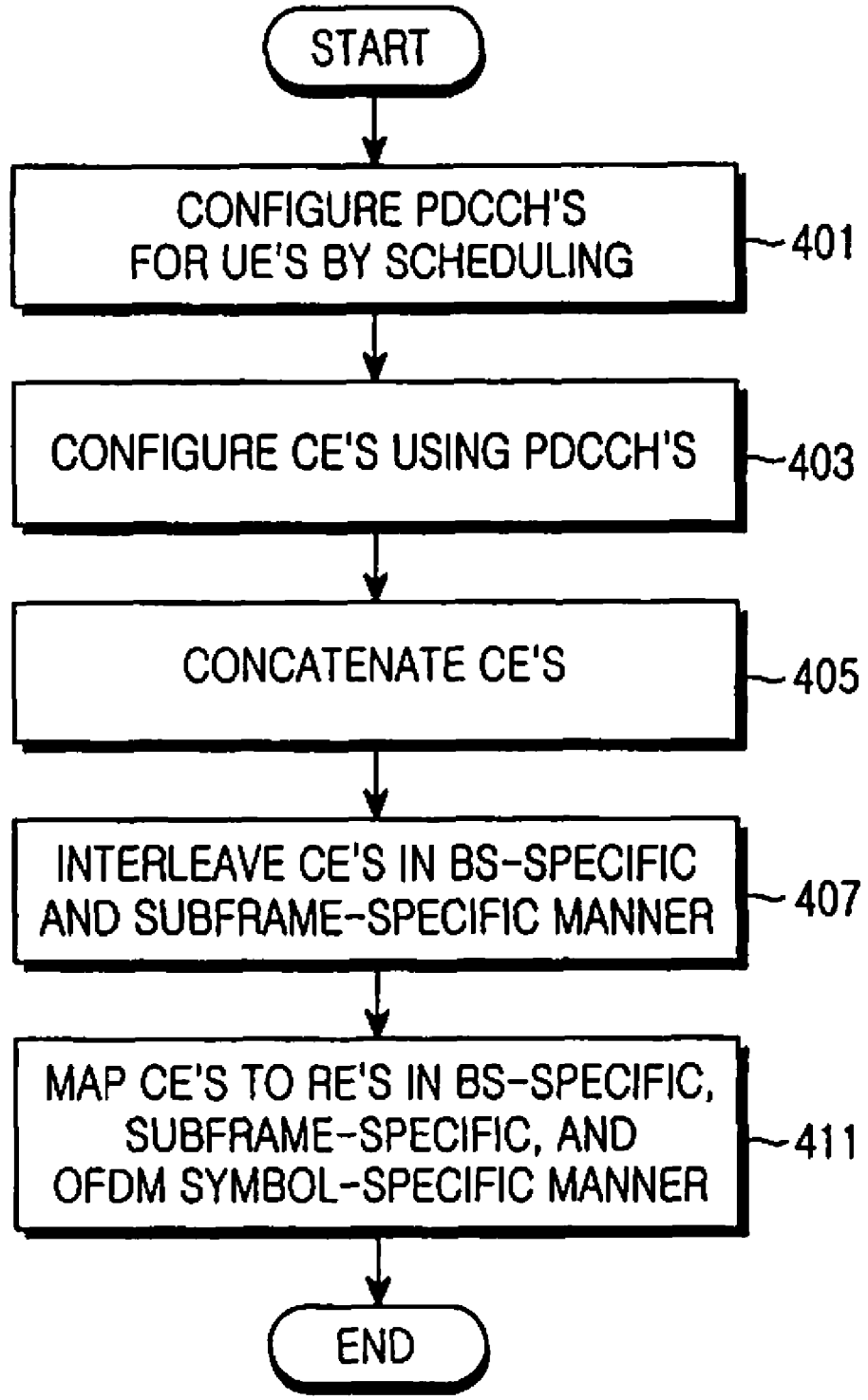
FIG. 4 is a flowchart illustrating a PDCCH transmission method according to the present invention.

FIG. 4 is a flowchart illustrating a PDCCH transmission method, specifically a CE-to-RE mapping operation of the transmission apparatus according to the present invention.

Referring to FIG. 4, a BS configures a PDCCH for each MS by predetermined scheduling in step 401. The total number of PDCCHs depends on the scheduling result. In step 403, the BS configures CEs with the PDCCHs. Herein, a PDCCH includes at least one CE. The BS concatenates the CEs in a predetermined method, which is not limited to a specific method, in step 405. The BS interleaves symbols in the concatenated CEs in a different manner for each BS or for each subframe and maps the interleaved symbols to REs on an OFDM symbol basis in step 411.

Figure 5:
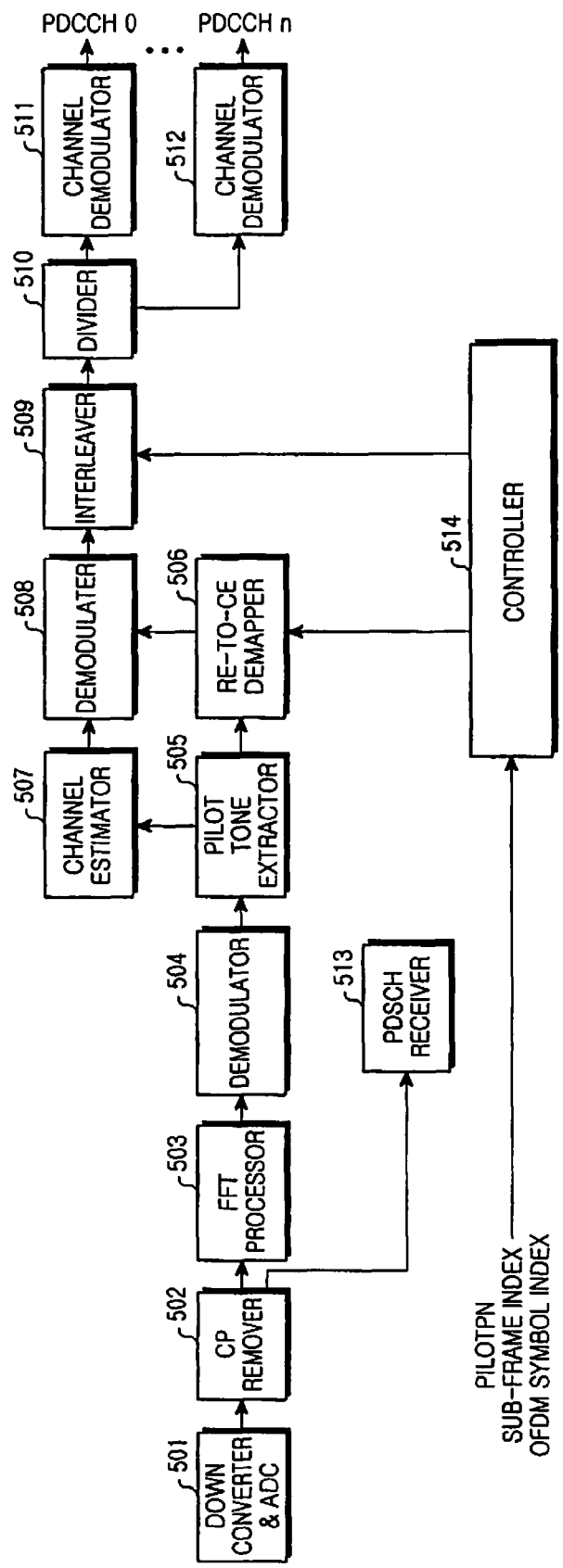
FIG. 5 is a block diagram of a PDCCH reception apparatus according to the present invention.

FIG. 5 is a block diagram of a PDCCH reception apparatus according to the present invention.

Referring to FIG. 5, a downconverter and an Analog-to-Digital Converter (ADC) 501 downconverts a Radio Frequency (RF) signal received through an antenna to a baseband signal and converts the analog signal to a digital signal. A CP remover 502 removes a CP from the digital signal. A Fast Fourier Transform (FFT) processor 503 converts the CP-removed time signal to frequency signals. After demultiplexing, subcarriers associated with a PDSCH are processed in a general OFDM data reception operation in a PDSCH receiver 513. Meanwhile, a pilot tone extractor 505 extracts pilots for respective antennas from demultiplexed REs to which CEs are mapped and a channel estimator 507 performs channel estimation using the pilot tones. An RE-to-CE demapper 506 extracts CEs from REs using information derived from PilotPN, a subframe index, and an OFDM symbol index, received from a controller 514. A demodulator 508 demodulates the CEs based on channel estimation information received from the channel estimator 507. A deinterleaver 509 deinterleaves the demodulated signal in a pattern generated based on the PilotPN, the subframe index, and the OFDM symbol index by the controller 514. A divider 510 divides the deinterleaved CEs into each piece of PDCCH information and channel decoders 511 to 512 decode the PDCCH information.

Figure 6:
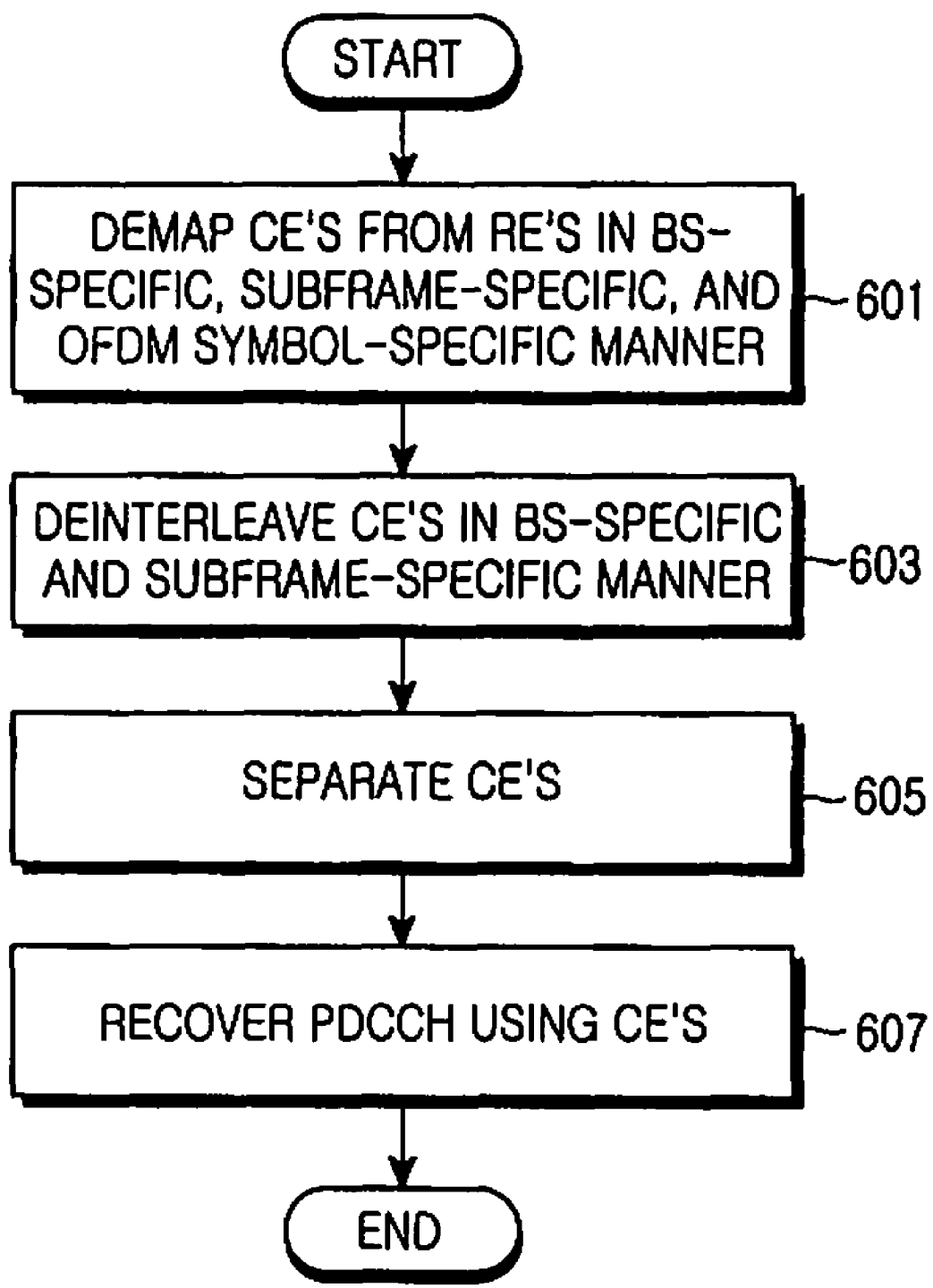
FIG. 6 is a flowchart illustrating a PDCCH reception method according to the present invention.
Figure 7:
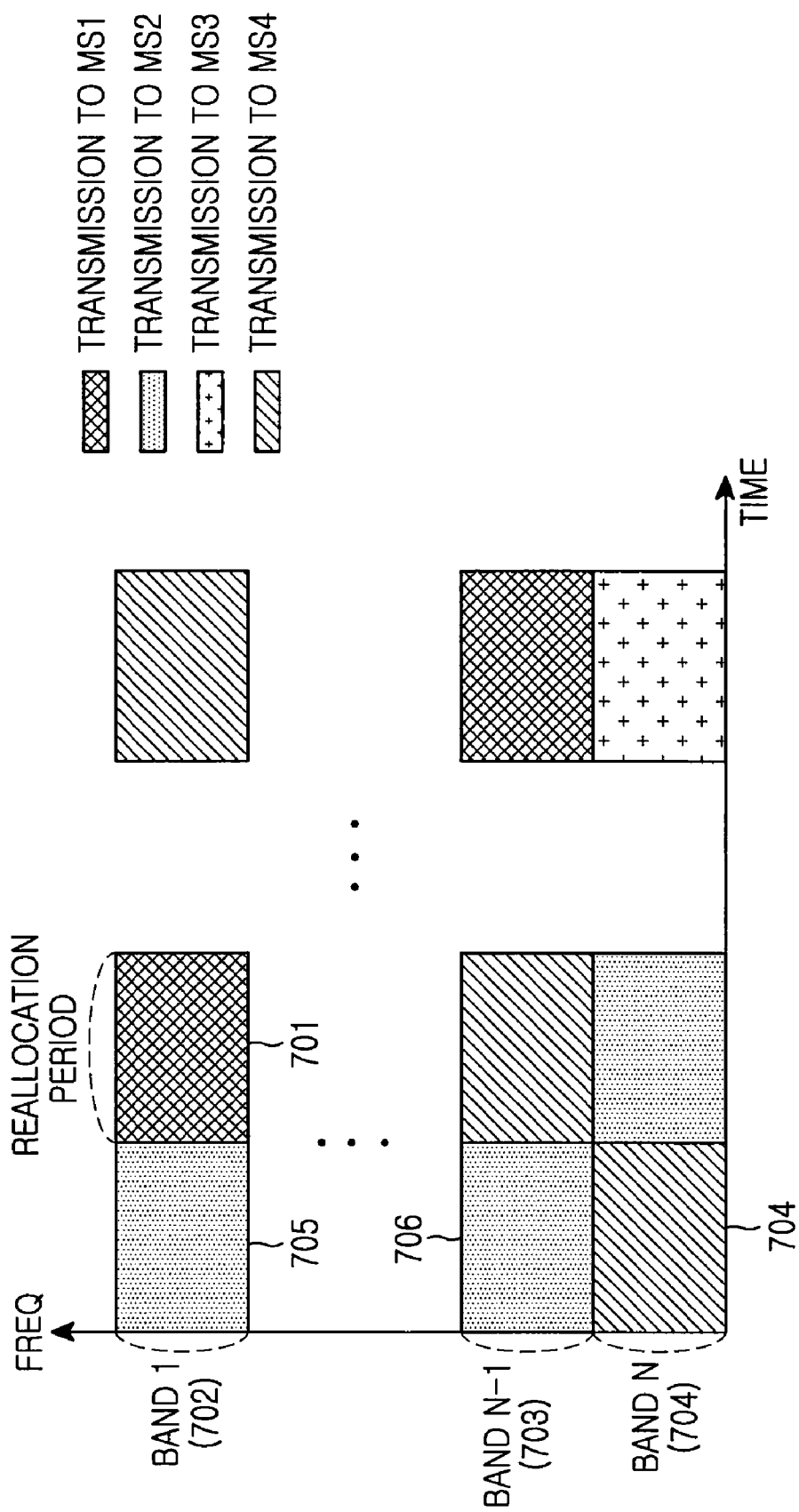
FIG. 7 illustrates a method for transmitting data to a plurality of users in a conventional OFDMA system.

FIG. 6 is a flowchart illustrating a PDCCH reception method according to the present invention.

Referring to FIG. 6, CEs are demapped from REs in a manner specific to a BS, a subframe, and an OFDM symbol in step 601 and deinterleaved in a BS-specific and subframe-specific manner in step 603. The deinterleaved CEs are divided in step 605 and PDCCHs are recovered with the divided CEs in step 607. Since one PDCCH can be formed with a plurality of CEs, the number of CEs for each PDCCH should be known in advance in step 607.

As is apparent from the above description, the present invention advantageously maximizes an interference diversity between BSs and provides an efficient system by interleaving downlink control channels in a BS-specific and subframe-specific manner and mapping CEs or LEs to REs in a BS-specific, subframe-specific, and an OFDM symbol-specific manner.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for mapping a plurality of Physical Downlink Control CHannels (PDCCHs) to resources in a wireless communication system, comprising:

allocating, by a concatenator, at least one Control channel Element (CE) to each of the plurality of PDCCHs;

concatenating, by the concatenator, if at least one PDCCH is scheduled to be transmitted in a subframe, elements in the plurality of PDCCHs;

interleaving, by an interleaver, the concatenated elements; and mapping, by a Control channel Elements (CE)-to-Resource Element (RE) mapper, the interleaved elements to at least one RE.

2. The method of claim 1, wherein the interleaving comprises interleaving the concatenated elements in a different offset for each Base Station or for each subframe.

3. The method of claim 1, wherein the mapping comprises sequentially mapping the interleaved elements to the REs.

4. A method for mapping a plurality of Physical Downlink Control CHannels (PDCCHs) to resources in a wireless communication system, comprising:

allocating, by a concatenator, if at least one PDCCH is scheduled to be transmitted in a subframe, at least one Control channel Element (CE) to each of the scheduled at least one PDCCH;

concatenating, by the concatenator, the allocated CEs;

interleaving, by an interleaver, symbols in the concatenated CEs; and mapping, by a CE-to-Resource Element (RE) mapper, the interleaved symbols to at least one RE.

5. The method of claim 4, wherein the interleaving comprises interleaving the concatenated CEs in a different offset for each Base Station or for each subframe.

6. The method of claim 4, wherein if all REs of an OFDM symbol are not used for the mapping, the mapping comprises sequentially mapping the interleaved CEs to the REs.

7. A method for mapping a plurality of Physical Downlink Control CHannels (PDCCHs) to resources in a wireless communication system, comprising:

allocating, by a concatenator, if at least one PDCCH is scheduled to be transmitted in a subframe, at least one Control channel Element (CE) to each of the scheduled at least one PDCCH;

concatenating, by the concatenator, the allocated CEs;

modulating, by a modulator, each of the concatenated CEs to at least one modulation symbol;

interleaving, by an interleaver, the modulation symbols; and mapping, by a CE-to-Resource Element (RE) mapper, the interleaved modulation symbols to REs.

8. The method of claim 7, wherein the interleaving comprises interleaving the modulation symbols in a different offset for each Base Station or for each subframe.

9. The method of claim 7, wherein the mapping comprises sequentially mapping the interleaved modulation symbols to the REs.

10. An apparatus for mapping a plurality of Physical Downlink Control CHannels (PDCCHs) to resources and transmitting the mapped PDCCHs in a wireless communication system, comprising:

a concatenator for, if at least one PDCCH is scheduled to be transmitted in a subframe, allocating at least one Control channel Element (CE) to each of the scheduled at least one PDCCH, and concatenating the allocated CEs;

an interleaver for interleaving symbols in the concatenated CEs; and a CE-to-Resource Element (RE) mapper for mapping the interleaved symbols to REs.

11. The apparatus of claim 10, wherein the interleaver interleaves the concatenated symbols in a different offset for each Base Station or for each subframe.

12. An apparatus for mapping a plurality of Physical Downlink Control CHannels (PDCCHs) to resources and transmitting the mapped PDCCHs in a wireless communication system, comprising:

a concatenator for, if at least one PDCCH is scheduled to be transmitted in a subframe, allocating at least one Control channel Element (CE) to each of the scheduled at least one PDCCH, and concatenating the allocated CEs;

a modulator for modulating each of the concatenated CEs to at least one modulation symbol;

an interleaver for interleaving the modulation symbols; and a CE-to-Resource Element (RE) mapper for mapping the interleaved modulation symbols to REs.

13. The apparatus of claim 12, wherein the interleaver interleaves the modulation symbols in a different offset for each Base Station or for each subframe.

14. An apparatus for receiving a Physical Downlink Control CHannel (PDCCH) mapped to resources in a wireless communication system, comprising:

an analog-to-digital converter for converting a signal, received through an antenna, to a digital signal;

a Fast Fourier Transform (FFT) processor for converting the digital signal to a frequency signal;

a pilot tone extractor for extracting pilot tones from Resource Elements (REs) to which Control channel Elements (CEs) are mapped among subcarriers of the frequency signal;

a channel estimator for performing channel estimation using the pilot tones;

a RE-to-CE demapper for demapping the CEs from the REs;

a deinterleaver for deinterleaving the demapped CEs;

a demodulator for demodulating the deinterleaved CEs using channel estimation information received from the channel estimator;

a divider for separating the demodulated CEs into pieces of PDCCH information; and a plurality of channel decoders for decoding the pieces of PDSCH information.

* * * * *